Feb. 9, 1971 F. MASSA 3,561,268
EXPENDABLE BATHYTHERMOGRAPH
Filed Jan. 14, 1969 2 Sheets-Sheet 1
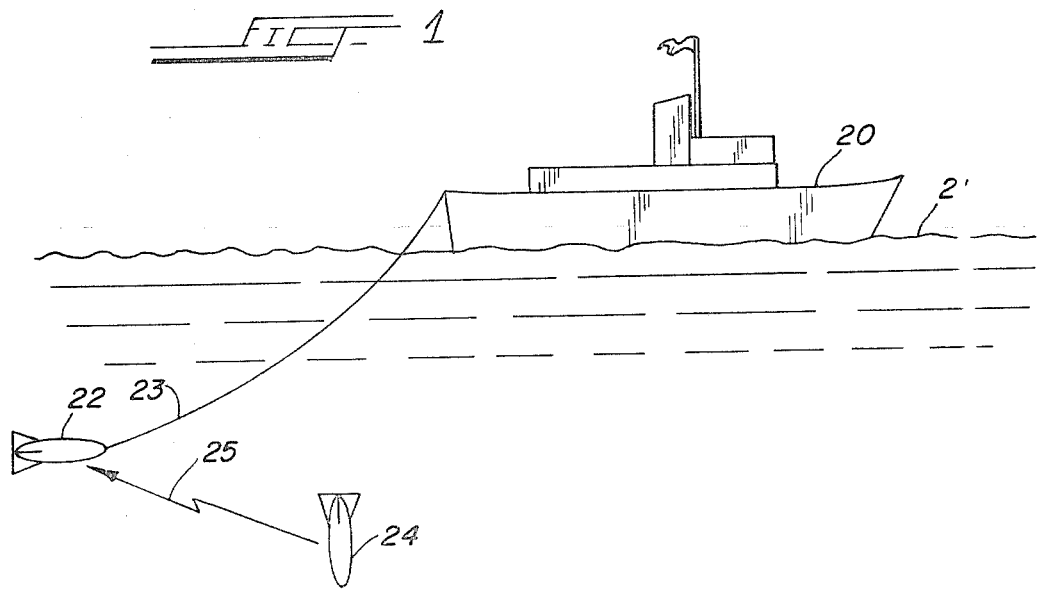
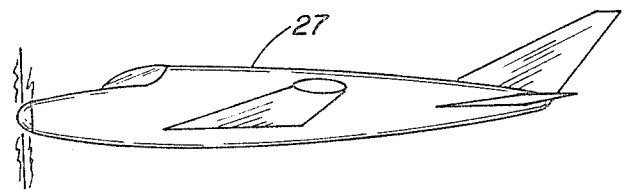
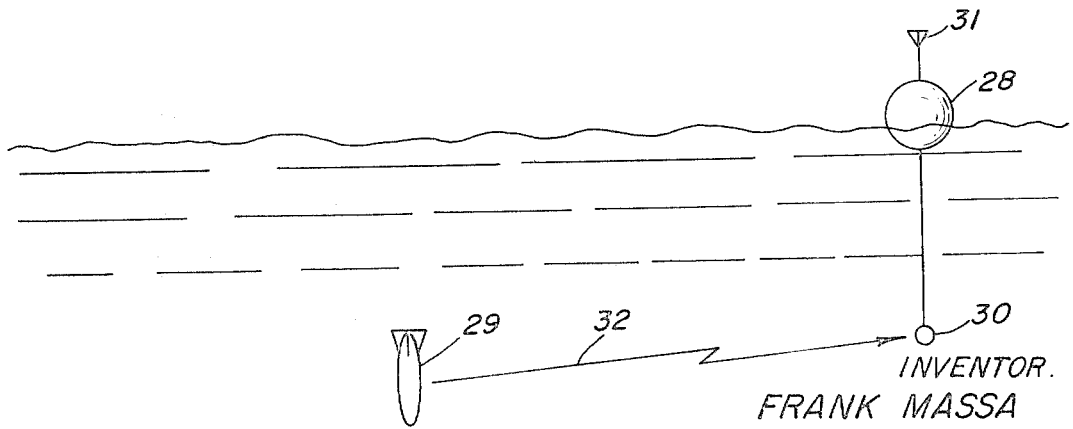
INVENTOR.
FRANK MASSA
BY Louis Bernat
ATTY.

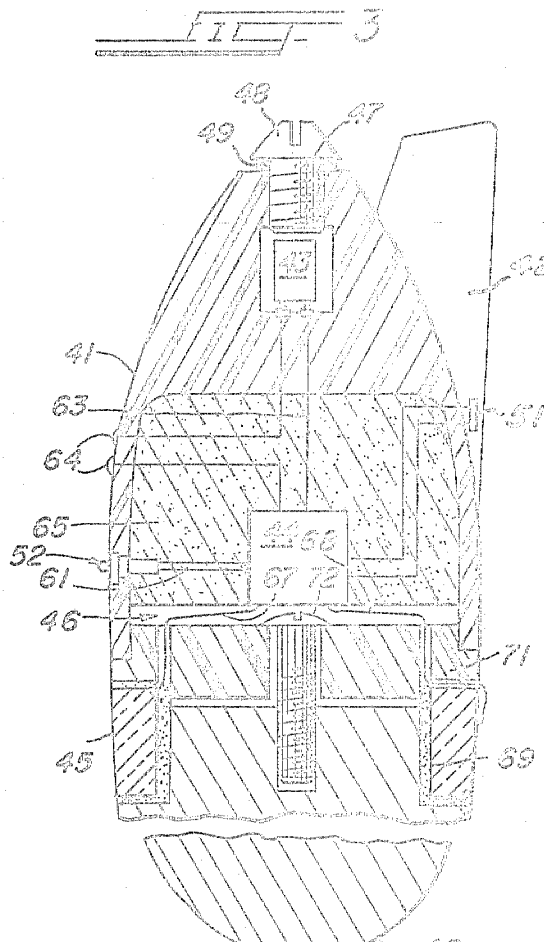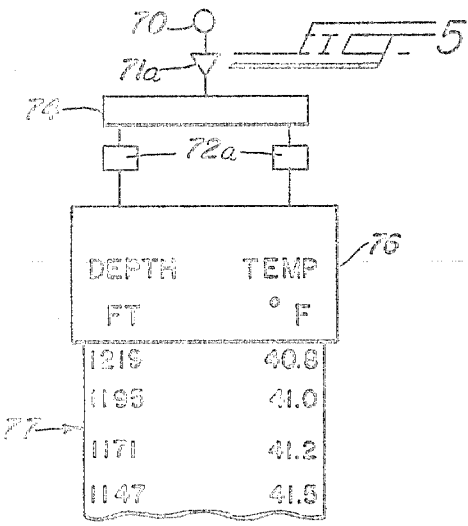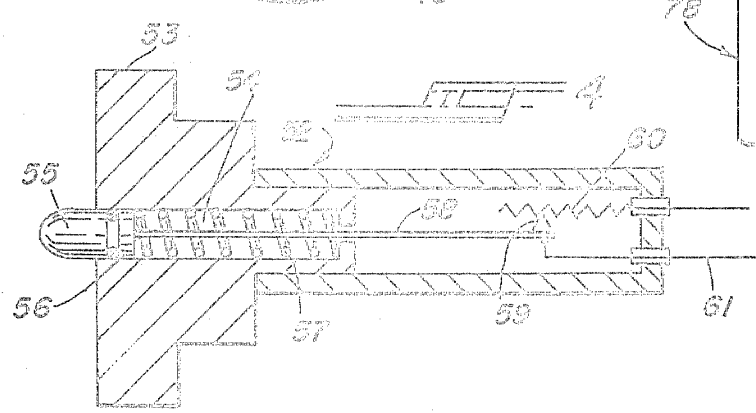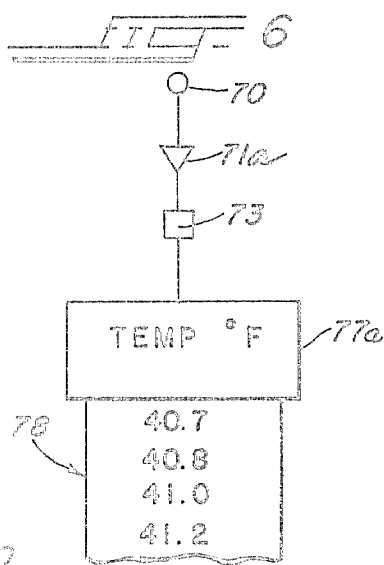

United States Patent Office 3,561,268
Patented Feb. 9, 1971

3,561,268
EXPENDABLE BATHYTHERMOGRAPH
Frank Massa, Cohasset, Mass., assignor to Massa Division, Dynamics Corporation of America, Hingham, Mass.
Filed Jan. 14, 1969, Ser. No. 790,965
Int. Cl. G01k 1/02; G01l 19/08
U.S. Cl. 73—345
14 Claims

ABSTRACT OF THE DISCLOSURE

Free-falling underwater body which has a streamlined hull characteristic that causes a stable rate of fall through water. The body contains an oscillator connected to a piezoelectric transmitting transducer for radiating sound waves through the water at the oscillator output frequency. Two sensors alter the oscillator output frequency as a function of depth and temperature. A receiver on the surface of the water receives the radiated sound waves and prints out the temperature and depth of the water through which the falling body is then passing.

---

This invention relates to an expendable bathythermograph which is a completely free-falling underwater body.

A bathythermograph is a device for recording a profile of temperature versus depth in a body of water such as the ocean. Heretofore, it has been a common practice to lower and raise a thermometer-like device attached to a line and to record the temperature of the water as the line is played in or out. Among other things, it is difficult to take these readings from a ship which is underway.

To improve upon the thermometer and overcome other problems, expendable bathythermographs have been designed to take a profile reading while they fall through the water. Then they are abandoned. These devices have generally included a probe and two reels or spools of wire, one spool on the ship and one spool in the probe. When the probe is dropped, both spools unreel and allow the probe to fall through the water. As the wire plays out, a temperature sensitive device in the probe returns signals to the ship which indicates the temperature. This device provides a number of advantages, as compared with a purely thermometer-like device, since it may be used while the ship is underway and since the probe is a low-cost device that may be thrown away. However, the wire is a clumsy device which is awkward to use. It affects the rate and direction at which the probe falls. The probe's useful operating depth is limited by the length of the wire.

Accordingly, an object of this invention is to provide new and improved bathythermographs. More particularly an object is to provide expendable bathythermographs which may be deployed from either a ship which is underway or a flying airplane. Here an object is to provide a completely free-falling probe which is not restrained by wires or any other mechanical connections to the surface.

Another object of this invention is to provide a low-cost bathythermograph probe which is expendable. In this connection, an object is to provide a probe which transmits telemetered signals from the probe to a ship or sonobuoy via a sonic wave carrier. Here an object is to vary or modulate the carrier to indicate the ambient temperature of the water through which the probe is passing. A further object is to modulate the carrier with a signal indicating the depth of the water through which the probe is passing.

Another object is to provide a temperature profile varying as a function of the depth of the ocean. Here an object is to provide an automatic print-out of the temperature and/or depth profile.

Still another object is to accomplish these and other objects by means of a probe which may be manufactured on general purpose machines without requiring a high capital investment in tools, jigs, and the like.

In keeping with an aspect of the invention, these and other objects are accomplished by a probe having a weight and streamlined hull configuration which enables it to drop at a predictable, fixed rate of fall. A piezoelectric ring-shaped transducer is driven by the output of an oscillator enclosed within the probe. A thermistor in the oscillator circuit controls and varies the frequency of oscillation as a function of ambient temperature. Hence, a monitor station may detect the temperature profile responsive to the frequency of a sonic or acoustic signal which it receives.

The depth of the probe may be related to the transmitted temperature signal by a pressure-sensor which further modulates the transmitted signal, as a function of depth. Or the depth may be calculated as a function of time, since the fall rate is known because the weight and streamlined hull of the probe create a gravity-drag relationship which causes the probe to fall at an accurately predictable rate.

These and other objects are acomplished in a preferred embodiment of the invention which may be understood from a study of the following description when taken in connection with the accompanying drawings in which:

FIG. 1 schematically shows a system including a moving ship towing an omnidirectional hydrophone for picking up acoustic signals transmitted from a free-falling bathythermograph probe;

FIG. 2 schematically shows a system including a flying airplane and a floating sonobuoy for relaying acoustic signals from the probe to the airplane;

FIG. 3 is a cross-sectional view of a bathythermograph probe for sending telemetered signals to the ocean surface via an acoustic carrier;

FIG. 4 is a cross-sectional view which shows a pressure-sensitive sensor for causing a modulation of the telemetered signals as a function of the instantaneous depth of the probe;

FIG. 5 show a system for printing out the temperature versus depth profile; and

FIG. 6 shows a simpler system for printing out the temperature, with depth being calculated as a function of the time known to have elapsed between the readings.

The broad principles of the total system are shown by FIGS. 1 and 2. In greater detail, FIG. 1 shows a ship 20 which is travelling at a fairly high speed through the water 21. It is towing an omnidirectional hydrophone receiver 22 at the end of a line 23. The ship has dropped a free-falling bathythermograph probe 24. As the probe 24 falls freely through the water, it sends acoustical telemetered signals 25 which are picked up by the towed hydrophone receiver 22 and relayed over cable 23 to shipboard receiver equipment.

In the system of FIG. 2, a flying airplane 27 drops a sonobuoy 28 and a free-falling bathythermograph probe 29. The sonobuoy 28 includes an omnidirectional hydrophone 30 and an antenna 31. A radio transmitter is inside the sonobuoy 28. As the probe 29 falls through the water, it sends acoustical telemetered signals 32 which are picked up by the hydrophone 30 and broadcast from the antenna 31 to the flying airplane.

In keeping with an aspect of the invention, each of these systems uses the same underwater, free-falling, bathythermograph probe, which is shown in cross-section detail in FIG. 3. The major portions of this probe are a nose section or weight 40, a tail section or hull 41, a suitable number of stabilizing fins (one of which is seen at 42), a battery 43, an oscillator 44, and an omnidirectional piezoelectric transmitting transducer 45. The nose weight 40 is any suitable streamlined element, such as a zinc die casting, for example.

The tail section or hull 41 may be a molded waterproof plastic piece part having the fins 42 integrally formed thereon, a cavity 46 in the forward section, and a threaded opening 47 in the rear section. The forward cavity 46 houses the oscillator 44 and suitable wiring. The oscillator may operate in, say, the 15–30 kHz. range. The threaded opening 47 is sealed by a screw 48 and an O-ring 49 clamped under the head of the screw 48. When the screw 48 is removed, the battery 43 may be inserted into the opening in order to power the oscillator 44.

The oscillator 44 may take any known form suitable for this use. The tank circuit of the oscillator includes a thermistor 51 mounted in a waterproof manner on the outside of the body of the probe. As the ambient temperature changes outside the probe, the thermistor characteristics also change to provide an electrical control signal. Hence, the output frequency $f_1$ of the oscillator 44 changes as a function of the ocean temperature through which the probe is falling. A pressure sensor 52 may be arranged to modulate the oscillator output frequency as a function of depth; or, it may cause the oscillator to produce a second depth indicating frequency $f_2$ widely separated from the temperature indicating frequency $f_1$. Either way, the oscillator produces a signal which varies as a function of both the temperature and the depth of the probe. Preferably, the low frequency (which represents depth or pressure) modulates a variable carrier frequency which represents temperature. However, any other suitable relationship may be represented in a similar manner.

A depth sensor is a device which is operated responsive to hydrostatic pressure, as shown in FIG. 4. The major parts of this sensor are a flanged faceplate housing 53 having a central bore 54 therein. Slidably mounted in the central bore 54 is a piston 55 having an O-ring 56 for sealing out the sea water. A spring 57 biases the piston 55 to an extended position; the hydrostatic pressure in the ocean pushes the piston 55 against the spring 57, and into the flanged housing 53. A push rod 58 moves in unison with the piston 55. The push rod carries a slider contact 59 associated with a potentiometer 60. Thus, the resistance across the wires 61 changes as a function of the hydrostatic pressure pushing the piston 55 inwardly against the force of spring 57.

Finally, the energy of the battery 43 (FIG. 3) is applied to the oscillator 44 via wires 63 which are broken at the two terminals 64 to form a sea water switch on the surface of the tail hull 41. When the probe is dropped into the ocean water, the minerals in the sea water cause a current to flow between the terminals 64. Hence, the ocean water automatically turns on the oscillator when the probe is dropped overboard. An alternative construction uses a sea water battery, and the screw 48 is arranged to admit sea water into the battery compartment at 43. In this construction the water switch 64 is omitted.

After these parts are in place in the cavity 46, a suitable potting compound 65 is poured into the cavity. The potting compound may be an epoxy, for example.

The transmitting transducer 45 is preferably a cylindrical shell of piezoelectric ceramic material, such as polarized barium titanate or lead zirconate titanate. The dimensions and contours of the ceramic shell are selected to continue the streamlined shape of the probe. The inside and outside circumferential sides of the cylinder are separately covered by metallic electrodes. These inside and outside electrodes are connected to the oscillator 44 output terminals via wires 67, 68, respectively. The cylindrical shell 45 "floats" in the pressure release material 69 which fills in the cavity behind and around the ceramic ring 45. The well-known corprene material may be used for this purpose.

A disk or bulkhead 71 is used to join the nose section weight 40 and the tail section hull 41 into a continuous streamlined body. Preferably, the disk is made from a waterproof plastic insulating material. In greater detail, both top and bottom sides of the disk 71 are circumferentially undercut about its periphery. The undercut region on the bottom of disk 71 fits within the ring-shaped opening formed by the pressure relief material 69. The undercut region on the top of the disk 71 fits within the open cavity 46 of the tail hull 41.

After the nose weight 40 and tail hull 41 are constructed as described above, the wires 67, 68 are threaded through clearance holes in disk 71. The disk 71 is fitted into the pressure release ring-shaped element 69. A bolt 72 attaches the disk 71 to the weight 40. Thereafter, the wires 67, 68 are connected to the output of the oscillator 44. Then, the tail section hull 41 is cemented to the top of the disk 71. Next, the entire unit is coated with a waterproof material, except for the terminals of the sea water switch 64.

The relative dimensions of the probe are somewhat important, although the parameters of such dimensions may vary over a fairly wide range. For 15–30 kHz. operation, the outside diameter of the ceramic ring 45 is in the general range of 1½ to 2 inches. For omnidirectional operation, the vertical height of the transducer cylindrical ring 45 should then be in the range of ¼ to ¾ of the wavelength of the radiated sound. This means that, in the 15–30 kHz. range, if the height of the ring 45 is about ½ to 1¼ times the outside diameter, the transmitting transducer will have an omnidirectional transmission pattern.

The remainder of the dimensions are set by the rate at which the probe drops. The diameter should be a minimum, and the weight of the nose piece 40 should be a maximum. The weight and streamlined shape should be such that the bathythermograph drops through the water at a high rate of speed. The drop speed should allow the probe to quickly reach a fixed velocity at which the drag of the water equals the pull of gravity. Thereafter, the drop rate will remain constant.

The operation of the system should become clear from FIGS. 5 and 6. As the probe (FIG. 3) drops through the water, the thermistor 51 changes the oscillator output frequency as a function of ambient ocean temperature. The pressure sensor 52 preferably changes a second oscillator frequency as a function of depth. The piezoelectric ring 45 radiates sound at the frequencies which identify both the temperature and depth.

The surface hydrophone receiving transducer 22 or 30 (FIGS. 1, 2) receives the sound radiated by the transducer 45. The receiving transducers are shown at 70 in FIGS. 5 and 6. The output of the receiving transducer is fed through an amplifier 71a on shipboard; or, it is broadcast over antenna 31 to a receiver and amplifier 71a on the aircraft.

The variable frequency picked up by the hydrophone 70 is applied to a bandpass filter arrangement 72a or 73. These filters pass the frequencies sent out from the probe and reject the general background noise. This extends the range over which the probe signal may be received. A demodulator 74 separates the temperature and depth signals. The frequency is then converted into a digital signal by any known device 76, 77. These digital signals are then printed out as at 77, 78. An alternative printout would include a pen recorder for drawing a graph which represents the temperature-depth profile.

The difference between the systems of FIGS. 5 and 6 is that the FIG. 5 system is more sophisticated in that both temperature and depth are recorded. On the other hand, the FIG. 6 system omits pressure sensor 52 in the probe, and the surface system is also less expensive in that only the temperature is recorded. The system user must relate this temperature report to the known fall rate of the probe.

One modification which falls within the scope and spirit of the invention relates to submarine usage. Here the nose weight 40 is changed into a hollow sphere having a positive buoyancy. When the probe is released, it rises to the surface and gives a temperature profile reading on the way up.

Still other modifications will readily occur to those who are skilled in the art. Therefore, the claims are to be construed broadly enough to cover all equivalents falling within the true scope and spirit of the invention.

I claim:

1. An expendable free-falling bathythermograph comprising means responsive to the ambient temperature of surrounding water for generating an electrical control signal, means responsive to said control signal for generating corresponding telemeter signals, means responsive to said telemeter signals for sending acoustical signals from said bathythermograph outwardly into said surrounding water, wherein said bathythermograph comprises a streamlined instrument made from two independent subassemblies, a first of said subassemblies being a nose piece including a streamlined weight with a cylindrical body section, cylindrical electroacoustic transducer means having an outside and inside diameter, said cylindrical body section of said streamlined nose being undercut to provide a reduced diameter for giving dimensional clearance for the inside diameter of said transducer means, a circular disk member shaped for rigid coaxial assembly to the cylindrical body section of said nose piece, said circular disk being circumferentially undercut at its periphery to provide a reduced diameter of the same approximate dimension as the reduced diameter of said cylindrical body section of said nose, said cylindrical transducer means being secured within the recessed cylindrical space formed by the undercut peripheries of said nose piece and said disk member, means for completing said first assembly by securing in axial alignment said nose piece, said transducer means, and said disk member, the second of said subassemblies comprising a generally hollow tapered streamlined tail section housing, a temperature sensitive probe mounted on the external surface of said housing, power supply means located within said housing, means responsive to said temperature probe and said power supply for providing electrical power for driving said electroacoustic transducer means, and means for rigidly securing said tail piece housing to the periphery of said disk member.

2. The bathythemograph of claim 1 and a potting compound filling said tapered streamlined housing after wiring of the components is complete.

3. The bathythermograph of claim 2 characterized in that a compartment is provided within the tail section housing to enclose a battery for providing said power supply means for operating the electrical equipment in said bathythermograph.

4. The bathythermograph of claim 3 further characterized in that a sea water switch opens a wire connecting the battery to the associated electrical equipment, said sea water switch comprising two exposed terminals mounted on the external surface of said tail section housing whereby an electrical connection is established across said exposed terminals when the assembly enters the water thus automatically activating the electrical equipment.

5. A system for making a temperature versus depth profile of a body of water comprising a self-contained free-falling bathythermograph probe means free of all connections with any other object, means inside said probe for sensing the absolute ambient temperature of the water through which the probe is falling, means responsive to said sensing means for generating an acoustic signal representing the temperature, means for sending said acoustic signal out through said water, depth sensing means comprising a spring biased potentiometer moved against said spring bias responsive to ambient water pressure outside said probe, means in said probe operated responsive to said depth sensing mean for sending back acoustic signals indicating the depth of the water through which the probe is then passing, means including a remote receiving hydrophone operated responsive to said acoustic signals for generating electrical control signals, and means responsive to said control signals for printing out a record of the temperature versus depth profile of the water through which said bathythermograph falls.

6. The bathythermograph of claim 5 wherein said bathythermograph comprises a streamlined hull having a circular transducer circumferentially blended into the streamlines of said hull, said acoustical signal means including said circular transducer, wherein said circular transducer comprises a cylindrical polarized piezoelectric ceramic ring.

7. The bathythemograph of claim 5 wherein said circular transducer comprises a cylindrical polarized piezoelectric ceramic ring and said ceramic ring is approximately 1½ to 2 inches in diameter.

8. The bathythermograph of claim 7 wherein said ceramic ring has a height which is approximately ½ to 1¼ the diameter of said ring.

9. The combination of claim 8 and a system for the high speed measurement of temperature versus depth profiles in ocean areas from a cruising patroling aircraft, said system comprising a radio sonobuoy including a floating radio antenna, a radio transmitter connected to said antenna, a hydrophone suspended from said sonobuoy, said hydrophone being responsive to said acoustic signals generated from said bathythermograph instrument, means comprising said radio transmitter for transmitting radio signals received from said hydrophone to said aircraft, means on said aircraft for separating said frequencies $f_1$ and $f_2$ from said radio signals, and means for simultaneously recording said separated frequencies as a function of time.

10. The combination of claim 9 characterized in that said recording means includes two digital frequency metering channels, and means for simultaneously printing said digital frequency data from both channels on a moving strip chart.

11. The bathythermograph of claim 5 wherein said acoustic signal generating means is an oscillator operating in the 15–30 kHz. range.

12. In combination in a bathythermograph instrument for measuring the temperature in a body of water, means including a temperature sensor for converting the adjacent water temperature into a first electrical quantity, a pressure sensor for converting the adjacent water pressure into a second electrical quantity, means for converting said first electrical quantity into an electrical signal having a frequency $f_1$, means for converting said second electrical quantity to a second electrical signal having a frequency $f_2$ which is widely separated from the frequency $f_1$, means for combining the two electrical signals so that one frequency signal modulates the other frequency signal which acts as a carrier, electroacoustic transducer means for converting said modulated electrical signals into corresponding acoustic signals which are sent out into the surrounding waters, means comprising a remote receiving hydrophone for converting said acoustic signals to electrical signals, means for separating said frequencies $f_1$ and $f_2$ from said electrical signals, means for simultaneously recording said separate frequencies as a function of time, said recording means including two digital frequency metering channels, and means for simultaneously printing said digital frequency data from both channels on a single print-out chart.

13. The combination of claim 12 characterized in that said bathythermograph instrument has positive buoyancy whereby it will rise to the surface when launched from a submerged submarine.

14. The combination of claim 13 further characterized in that said recording means includes two digital frequency metering channels.

References Cited
UNITED STATES PATENTS

| | | | |
|---|---|---|---|
| 3,349,613 | 10/1967 | Francis | 73—170 |
| 3,038,143 | 6/1962 | Dow | 340—5 |
| 3,069,573 | 12/1962 | Van Liew | 340—10 |
| 3,135,943 | 6/1964 | Richard | 73—170 |
| 3,273,393 | 9/1966 | Spark | 73—170 |

LOUIS R. PRINCE, Primary Examiner

D. E. CORR, Assistant Examiner

U.S. Cl. X.R.

73—170; 340—5